US007290721B2

(12) United States Patent　　(10) Patent No.:　　US 7,290,721 B2
Cheng　　(45) Date of Patent:　　Nov. 6, 2007

(54) METHOD AND APPARATUS FOR MEASURING THE TEMPERATURE OF A COMPUTER SYSTEM AND OPERATING THE COOLING FANS

(75) Inventor: Shih-Tien Cheng, Taipei (TW)

(73) Assignee: Shuttle Inc., Taipei (TW)

( * ) Notice: Subject to any disclaimer, the term of this patent is extended or adjusted under 35 U.S.C. 154(b) by 577 days.

(21) Appl. No.: 10/833,145

(22) Filed: Apr. 28, 2004

(65) Prior Publication Data

US 2005/0103873 A1　　May 19, 2005

(30) Foreign Application Priority Data

Nov. 19, 2003　　(TW) ............................... 92132434 A

(51) Int. Cl.
*F24F 7/00*　　(2006.01)
(52) U.S. Cl. ..................... 236/49.3; 700/299; 700/300
(58) Field of Classification Search ................ 361/687, 361/690, 695; 62/178; 236/49.3
See application file for complete search history.

(56) References Cited

U.S. PATENT DOCUMENTS 5,422,806 A * 6/1995 Chen et al. .................. 700/29
6,337,630 B1 * 1/2002 Hass et al. .................. 340/606
6,352,055 B1 * 3/2002 Algrain et al. ........... 123/41.44
6,574,082 B2 * 6/2003 Vitek .......................... 361/78
6,901,303 B2 * 5/2005 Larson et al. ............... 700/108
6,996,441 B1 * 2/2006 Tobias ........................ 700/44

* cited by examiner

*Primary Examiner*—Frantz Jules
*Assistant Examiner*—Huseyin Koca
(74) *Attorney, Agent, or Firm*—Birch, Stewart, Kolasch & Birch, LLP

(57) ABSTRACT

A method and apparatus for measuring the temperature of a computer system provides a first temperature sensor, positioned around or on a CPU, for sensing the temperature of the CPU or around the CPU. A first A/D converter is used to convert the temperature sensed by the first temperature sensor into a first temperature value. At least one second temperature sensor, positioned inside the housing, senses the temperature around the housing. At least one second A/D converter converts the temperature sensed by die second temperature sensor into a second temperature value. The first temperature value and second temperature value are input to a control circuit, and a suitable value to output a control signal for controlling the speed of the fan is chosen so as to precede the heat dissipating of the computer system.

8 Claims, 2 Drawing Sheets

METHOD AND APPARATUS FOR MEASURING THE TEMPERATURE OF A COMPUTER SYSTEM AND OPERATING THE COOLING FANS

FIELD OF THE INVENTION

The present invention relates generally to a method and apparatus for measuring temperature. More particularly, the present invention relates to a method and apparatus for measuring the temperature of a computer system, wherein, a plurality of temperature sensors are respectively placed inside the housing of a computer system to detect the temperature inside and around the housing, and regulate the speed of a fan according to the temperature detected by these sensors so as to precede the heat dissipating of the computer system.

BACKGROUND OF THE INVENTION

Generally, a fan has been installed inside the computer housing to exhaust out the heat inside the housing generated by a plurality of elements such as CPU, Hard disk Drive etc. so as to reduce the temperature inside the housing. But when the fan is operating at high speed, noise will be generated. Thus, for controlling the speed of the fan, at least one temperature sensor is generally installed inside the computer housing to sense the temperature, and regulates the speed of the fan according to the temperature detected by the sensor.

Wherein, some computer manufacturers install a sensor near or on the CPU, for example but not limited to under the CPU so as conveniently to measure the temperature of the CPU. However, this way just measures the temperature that CPU is operating, but ignores the temperature raising due to the heat generated by other components for example but not limited to Hard disk Drive, CD-ROM Drive, or other electronic components. Thus, the temperature measuring will lose it's objective. For example, sometimes the temperature detected from the CPU is very high, but the temperature measured inside the housing is not, at this time, if increasing the speed of the fan so as to precede the heat dissipating of the computer system does not efficiently reduce the temperature inside the computer housing, and the noise that is generated with the fan operating at high speed will be greatly increased.

Some computer manufacturers also install a sensor inside the housing, for example but not limited to near the Hard disk Drive so as to conveniently measure the temperature while the computer is operating. However, this way still measures the temperature at a certain position inside the housing that the computer is operating, but ignores the temperature raising due to the heat generated by other components for example but not limited to CPU, CD-ROM Drive, or other electronic components. Thus, the temperature measuring will still lose it's objective. For example, sometimes the temperature detected from a certain position inside the housing is very high, but the temperature measured from the CPU is not, at this time, if increasing the speed of the fan so as to precede the heat dissipating of the computer system does not efficiently reduce the temperature inside the computer housing, and the noise that is generated with the fan operating at high speed will be greatly increased.

Therefore, it needs a method and apparatus for measuring the temperature of a computer system, wherein, a plurality of temperature sensors are respectively placed inside the housing of a computer system to detect the temperature inside and around the housing, and regulate the speed of a fan according to the temperature detected by these sensors so as to precede the heat dissipating of the computer system.

SUMMARY OF THE INVENTION

To solve the above problems, it is an object of the present invention to provide a method for measuring the temperature of a computer system, which installs a plurality of sensors inside the computer housing to respectively sense the temperature inside the housing and around the housing, and regulates the speed of the fan according to the temperature sensed by the sensors.

To accomplish the above object of the present invention, the method for measuring the temperature of a computer system comprising the steps of: providing a first temperature sensor, positioned around or on a CPU, for sensing the temperature of the CPU or around the CPU; using a first A/D converter to convert the temperature sensed by the first temperature sensor into a first temperature value; providing at least one second temperature sensor, positioned certain position inside the housing, for sensing the temperature around the housing; using at least one second A/D converter to convert the temperature sensed by the second temperature sensor into a second temperature value; and inputting the first temperature value and second temperature value to a control circuit, and choosing a suitable value to output a control signal for controlling the speed of the fan according to the first temperature value and second temperature value so as to precede the heat dissipating of the computer system.

To solve the above problems, it is another object of the present invention to provide a temperature measuring apparatus, which comprises a plurality of sensors inside the computer housing to respectively sense the temperature inside the housing and around the housing, and regulates the speed of the fan according to the temperature sensed by the sensors.

To accomplish the above object of the present invention, the temperature measuring apparatus comprises: a first temperature sensor, positioned around or on a CPU, for sensing the temperature of the CPU or around the CPU; a first A/D converter, coupled to the first temperature sensor, for converting the temperature sensed by the first temperature sensor into a first temperature value; at least one second temperature sensor, positioned at certain position inside the housing, for sensing the temperature around the housing; at least one second A/D converter, each second A/D converter coupled to each second temperature sensor respectively, for converting the temperature sensed by the second temperature sensor into a second temperature value; and a control circuit, coupled to the first A/D converter and the second A/D converter respectively, choosing a suitable value to output a control signal for controlling the speed of the fan according to the first temperature value and second temperature value so as to precede the heat dissipating of the computer system.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
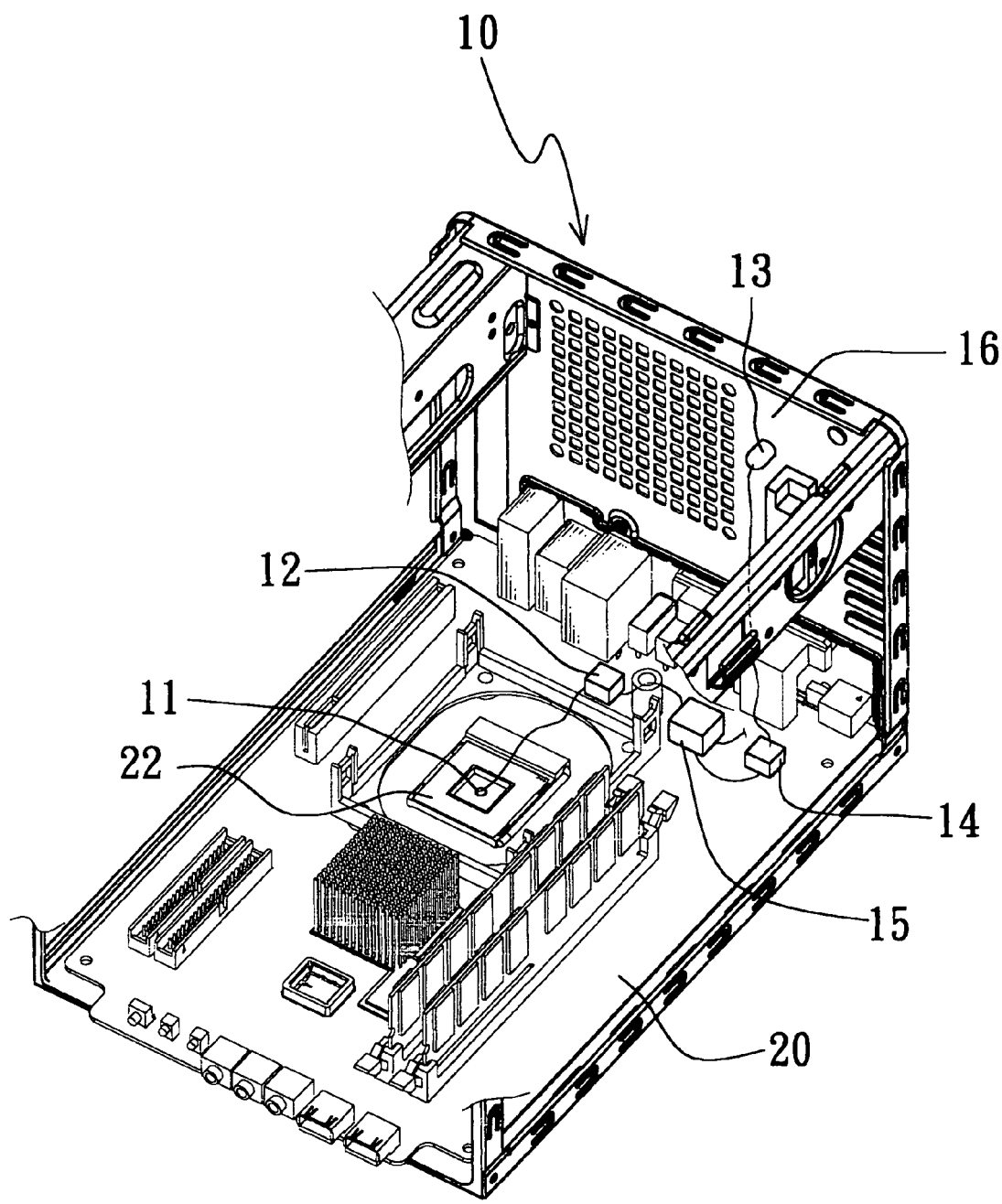
FIG. 1 shows a block diagram of a temperature measuring apparatus in accordance with one embodiment of the present invention.
Figure 2:
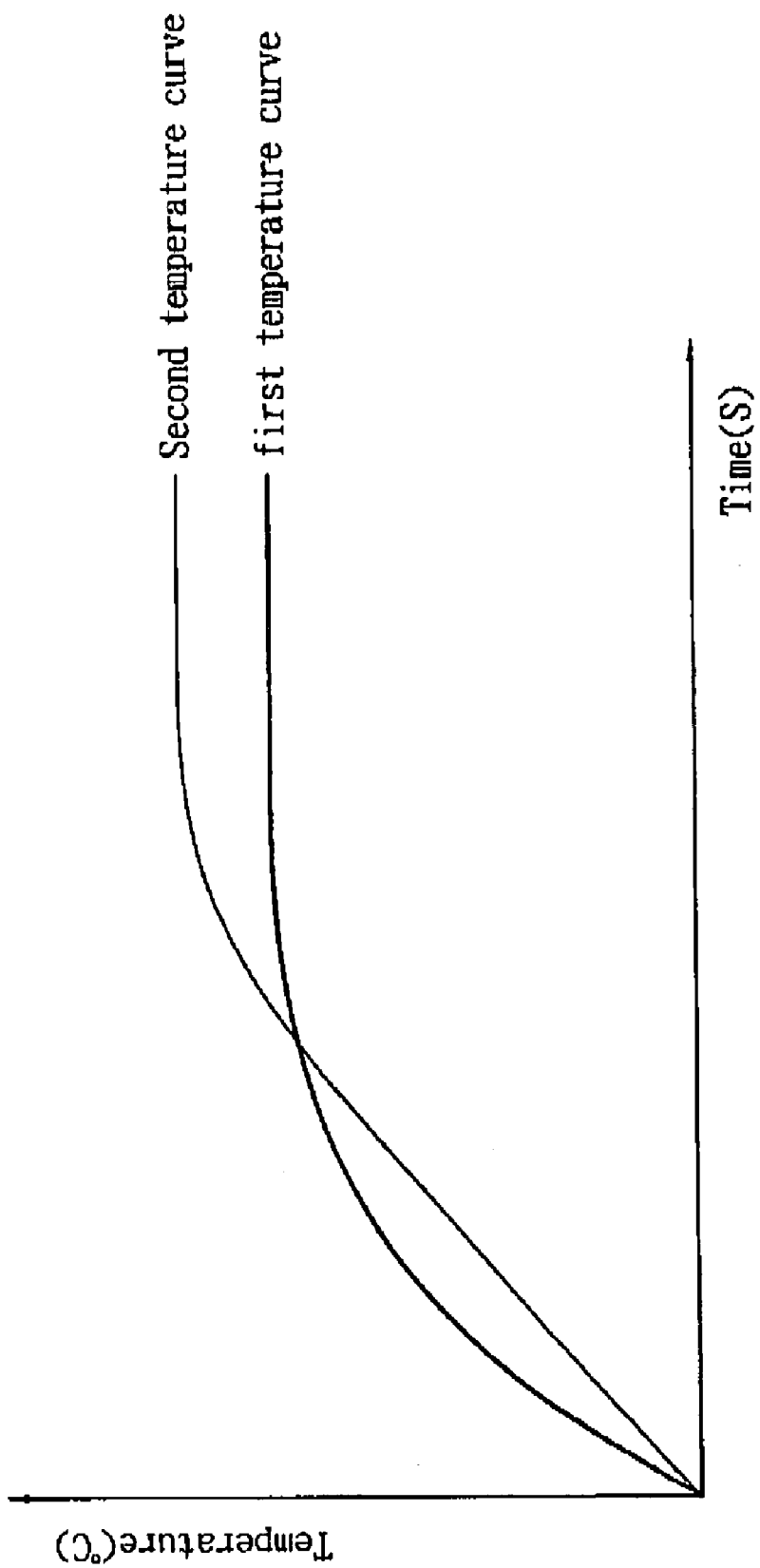
FIG. 2 shows the temperature curves of the present invention.

Referring to FIG. 1 shows a block diagram of a temperature measuring apparatus in accordance with one embodiment of the present invention. As shown in FIG. 1, the temperature measuring apparatus is installed inside or around a computer housing 10 to measure the temperature inside or around the computer housing 10 and controlled the speed of the fan according to the temperature, which comprises: a first temperature sensor 11; a first A/D converter 12; at least one second temperature sensor 13; at least one second A/D converter 14; and a control circuit 15.

Wherein, the first temperature sensor 11, is positioned around or on a CPU (not shown) of a motherboard 20, for example but not limited to be positioned under the CPU for sensing the temperature of the CPU or around the CPU; the first A/D converter 12 is coupled to the first temperature sensor 11 for converting the temperature sensed by the first temperature sensor 11 into a first temperature value and the first temperature value will be accumulated and constituted a first temperature curve while time is passing, and then the first temperature curve is passed to the control circuit 15 for determining and processing.

The at least one second temperature sensor 13 is positioned at certain position inside the housing 10 for example but not limited to be positioned on the rear sidewall 16 or near the wind gap of the housing 10 for sensing the temperature around the housing 10. While the second temperature sensor 13 is positioned toward inside the housing 10 for sensing the temperature inside the housing 10, and while the second temperature sensor 13 is positioned toward outside the housing 10 for sensing the temperature outside the housing 10.

The at least one second A/D converter 14, wherein each second A/D converter is coupled to each second temperature sensor respectively 13 for converting the temperature sensed by the second temperature sensor 13 into a second temperature value and the second temperature value will be accumulated and constituted a second temperature curve while time is passing, and then the second temperature curve is passed to the control circuit 15 for determining and processing; and a control circuit 15 coupled to the first A/D converter 12 and the second A/D converter 14 respectively chooses a suitable value to output a control signal for controlling the speed of the fan according to the first temperature value and second temperature value so as to precede the heat dissipating of the computer housing 10. Wherein the suitable value for example but not limited to the maximum value of the first temperature curve and second temperature curve, and the first A/D converter 12, the second A/D converter 14 and the control circuit 15 are preferably installed on the motherboard 20.

While the temperature measuring apparatus assembled, the first temperature sensor 11 can be positioned around or on a CPU (not shown) of a motherboard 20, for example but not limited to be positioned under the CPU slot 22 for sensing the temperature of the CPU or around the CPU while the CPU is running; and then the second temperature sensor 13 is positioned at certain position inside the housing 10 for example but not limited to be positioned on the rear sidewall 16 or near the wind gap of the housing for sensing the temperature around the housing 10 for example but not limited to sense the temperature outside the housing 10, and another second temperature sensor 13 is also positioned at certain position inside the housing 10 for example but not limited to be positioned around the Hard Disk Drive (not shown) of the housing 10 for sensing the temperature around the Hard disk Drive. Using the first A/D converter 12 and a plurality of second A/D converter 14 to respectively convert the temperature around the CPU, the temperature around the Hard disk Drive and the temperature outside the housing into the digital form and transfer them to the control circuit 15 to process. The control circuit 15 regulates the speed of the fan according to the two approaching values of the temperature around the CPU, the temperature around the Hard disk Drive and the temperature outside the housing. For example, if the temperature around the CPU, the temperature around the Hard disk Drive and the temperature outside the housing are 50° C., 40° C., 30° C. respectively, then the control circuit 15 will choose the maximum value of the two approaching values 50° C. (i.e. the temperature around the CPU and the temperature around the Hard disk Drive), and regulate what heat dissipation grade the 50° C. belongs to and outputs a control signal to control the speed of the fan so as to precede the heat dissipating of the computer housing.

Furthermore, the present invention also provides a method for measuring the temperature of a computer system, which comprising the steps of: providing a first temperature sensor 11, positioned around or on a CPU, for sensing the temperature of the CPU or around the CPU (step 1); using a first A/D converter 12 to convert the temperature sensed by the first temperature sensor 11 into a first temperature value (step 2); providing at least one second temperature sensor 13, positioned at certain position inside the housing 10, for sensing the temperature around the housing 10 (step 3); using at least one second A/D converter 14 to convert the temperature sensed by the second temperature sensor 13 into a second temperature value (step 4); and inputting the first temperature value and second temperature value to a control circuit 15, and choosing a suitable value to output a control signal for controlling the speed of the fan according to the first temperature value and second temperature value so as to precede the heat dissipating of the computer system (step 5).

Wherein, the first temperature sensor 11 of the step 1 is positioned around or on a CPU (not shown) of a motherboard 20, for example but not limited to be positioned under the CPU slot 22 for sensing the temperature of the CPU or around the CPU while the CPU is running.

The first A/D converter 12 of the step 2 is coupled to the first temperature sensor 11 for converting the temperature sensed by the first temperature sensor 11 into a first temperature value that is a digital form and the first temperature value will be accumulated and constituted a first temperature curve while time is passing, and then the first temperature curve is passed to the control circuit 15 for determining and processing.

The at least one second temperature sensor 13 of the step 3 is positioned at certain position inside the housing 10 for example but not limited to be positioned on the rear sidewall 16 or near the wind gap of the housing 10 for sensing the temperature around the housing 10. While the second temperature sensor 13 is positioned toward inside the housing 10 for sensing the temperature inside the housing 10, and while the second temperature sensor 13 is positioned toward outside the housing 10 for sensing the temperature outside the housing 10.

The at least one second A/D converter 14 of the step 4, wherein each second A/D converter is coupled to each second temperature sensor respectively 13 for converting the temperature sensed by the second temperature sensor 13 into a second temperature value and the second temperature value will be accumulated and constituted a second temperature curve while time is passing, and then the second temperature curve is passed to the control circuit 15 for determining and processing.

The control circuit 15 of the step 5 chooses a suitable value for example but not limited to the maximum value to output a control signal for controlling the speed of the fan according to the first temperature value and second temperature value so as to precede the heat dissipating of the computer housing 10.

While the invention has been described with reference to a preferred embodiment thereof, it is to be understood that modifications or variations may be easily made without departing from the spirit of this invention, which is defined by the appended claims.

What is claimed is:

1. A temperature measuring apparatus, for measuring the temperature of a housing of a computer system and the temperature around said housing to regulate the speed of a fan so as to precede the heat dissipating of said computer system, which comprises: a first temperature sensor, positioned around or on a CPU, for sensing the temperature of said CPU or around said CPU; a first A/D converter, coupled to said first temperature sensor, for converting the temperature sensed by said first temperature sensor into a first temperature value; at least one second temperature sensor, positioned at a certain position inside said housing, for sensing the temperature around said housing; at least one second A/D converter, each second A/D converter coupled to each said second temperature sensor respectively, for converting the temperature sensed by said second temperature sensor into a second temperature value; and a control circuit coupled to said first A/D converter and said second A/D converter respectively, choosing a suitable value to output a control signal for controlling said speed of said fan according to said first temperature value and second temperature value so as to precede the heat dissipating of said computer system, wherein said first temperature value further constitutes a first temperature curve, and said second temperature value further constitutes a second temperature curve, and said control circuit chooses said suitable value to output said control signal according to said first temperature curve and second temperature curve, and wherein said suitable value is the maximum value of said first temperature curve and second temperature curve.

2. A temperature measuring apparatus as claimed in claim 1, wherein said second temperature sensor is positioned on a sidewall or near a wind gap of said housing for sensing the temperature inside said housing.

3. A temperature measuring apparatus as claimed in claim 1, wherein said second temperature sensor is positioned on a sidewall or near a wind gap of said housing for sensing the temperature outside said housing.

4. A temperature measuring apparatus as claimed in claim 1, wherein said first A/D converter, said at least one second A/D converter and said control circuit are positioned on a motherboard.

5. A method for measuring the temperature of a computer system, which comprising the steps of: providing a first temperature sensor, positioned around or on a CPU, for sensing the temperature of said CPU or around said CPU; using a first A/D converter to convert the temperature sensed by said first temperature sensor into a first temperature value; providing at least one second temperature sensor, positioned at a certain position inside said housing, for sensing the temperature around said housing; using at least one second A/D converter to convert the temperature sensed by said second temperature sensor into a second temperature value; and inputting said first temperature value and second temperature value to a control circuit, and choosing a suitable value to output a control signal for controlling said speed of said fan according to said first temperature value and second temperature value so as to precede the heat dissipating of said computer system, wherein said first temperature value further constitutes a first temperature curve, and said second temperature value further constitutes a second temperature curve, and said control circuit chooses said suitable value to output said control signal according to said first temperature curve and second temperature curve, and wherein said suitable value is the maximum value of said first temperature curve and second temperature curve.

6. A method for measuring the temperature of a computer system as claimed in claim 5, wherein said second temperature sensor is positioned on a sidewall or near a wind gap of said housing for sensing the temperature inside said housing.

7. A method for measuring the temperature of a computer system as claimed in claim 5, wherein said second temperature sensor is positioned on a sidewall or near a wind gap of said housing for sensing the temperature outside said housing.

8. A method for measuring the temperature of a computer system as claimed in claim 5, wherein said first A/D converter, said at least one second A/D converter and said control circuit are positioned on a motherboard.

* * * * *